United States Patent [19]
Watson

[11] 3,975,916
[45] Aug. 24, 1976

[54] LAMINATED PIER BUMPER
[75] Inventor: Bert E. Watson, Santa Clara, Calif.
[73] Assignee: Pawling Rubber Corporation, Pawling, N.Y.
[22] Filed: Mar. 14, 1975
[21] Appl. No.: 558,218

[52] U.S. Cl. .................................. 61/48; 114/219; 256/1
[51] Int. Cl.² ...................... E02B 3/22; B63B 21/00
[58] Field of Search .................. 61/48, 46; 114/219; 256/1, 13.1; 267/136, 138, 139, 140, 141, 142; 104/254; 293/60, 65, 69 R

[56] References Cited
UNITED STATES PATENTS

| | | | |
|---|---|---|---|
| 3,096,973 | 7/1963 | Berger | 114/219 X |
| 3,306,053 | 2/1967 | Fulton | 114/219 X |
| 3,353,812 | 11/1967 | Miller | 114/219 X |
| 3,381,484 | 5/1968 | Laughlin | 61/48 |
| 3,449,917 | 6/1969 | Roskopf | 114/219 X |
| R18,672 | 11/1932 | Lyons | 114/219 |

*Primary Examiner*—Dennis L. Taylor
*Attorney, Agent, or Firm*—Mandeville and Schweitzer

[57] ABSTRACT

The disclosure relates to a pier bumper assembly intended particularly for marine application, for protecting dock pilings and dolphins from impact and chafing by contact with ships and barges. The bumper assembly is vertically oriented, and is secured over an exposed face of a marine piling. The pier bumper, which may have a substantial vertical height (e.g., 16 feet would not be unusual) is comprised of a vertically laminated stack of elastic plates, which are held under substantial compression by rods extending vertically through the stack. Along one side, the elastic plates are of deeply concave contour, to receive and partly embrace the generally cylindrical contours of the marine piling. A generally flat front face forms the impact surface.

At two or more locations along the overall vertical length of the bumper assembly, one or more of the plates are recessed and curved, to form a retaining groove. Cables received in the retaining grooves serve to secure the bumpers to the marine piling.

Typically, the dock bumpers of the invention may be utilized in conjunction with a plurality of side-by-side marine pilings, providing cooperative interaction between adjacent bumper assemblies.

4 Claims, 6 Drawing Figures

U.S. Patent  Aug. 24, 1976  Sheet 1 of 2  3,975,916
FIG. 1
FIG. 2
FIG. 6
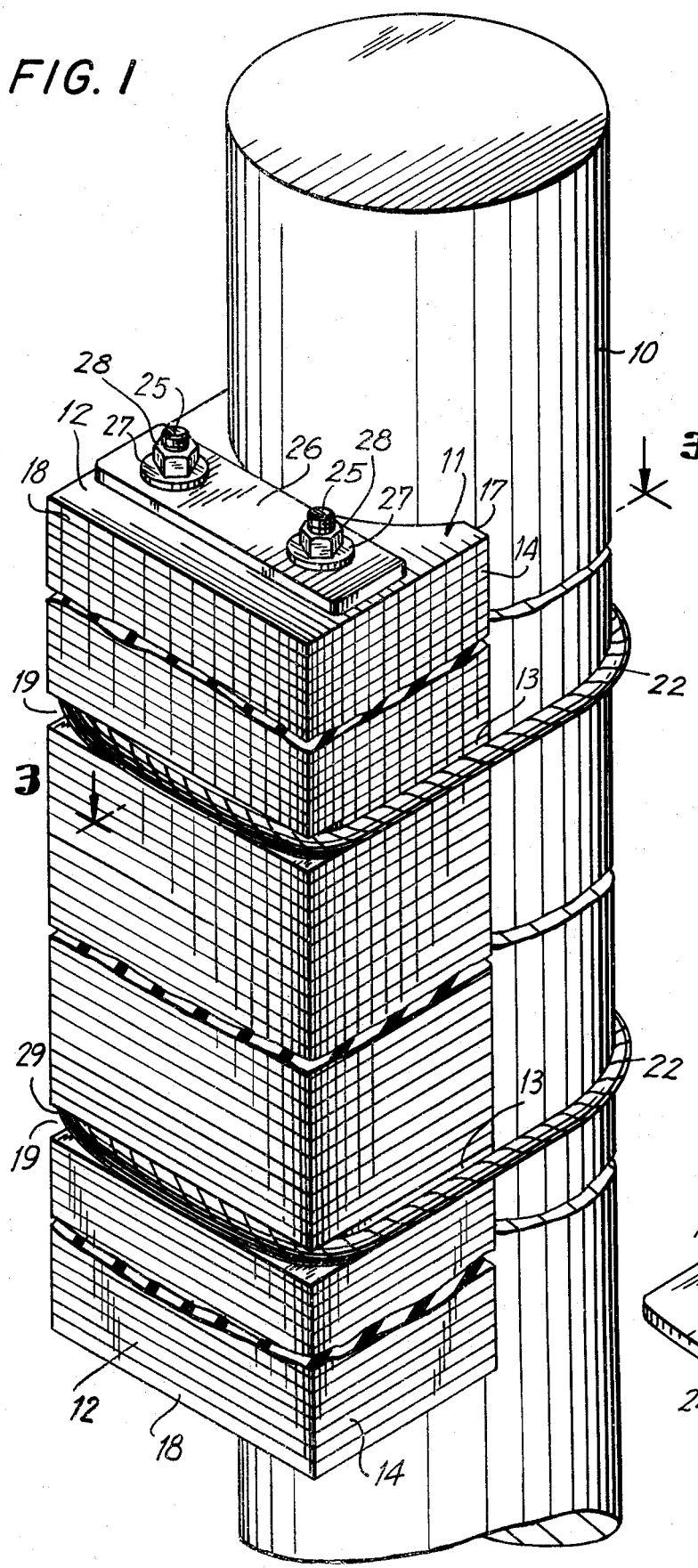
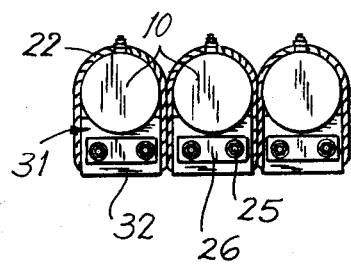
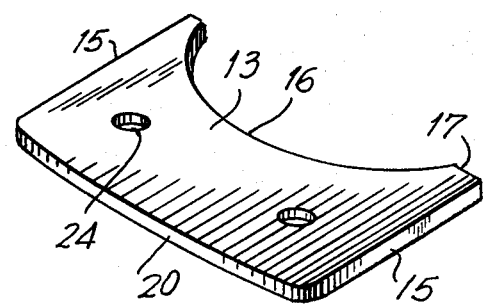

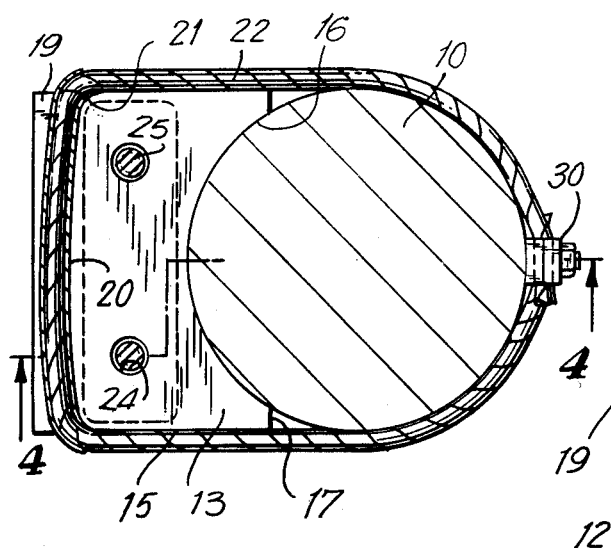
FIG. 3
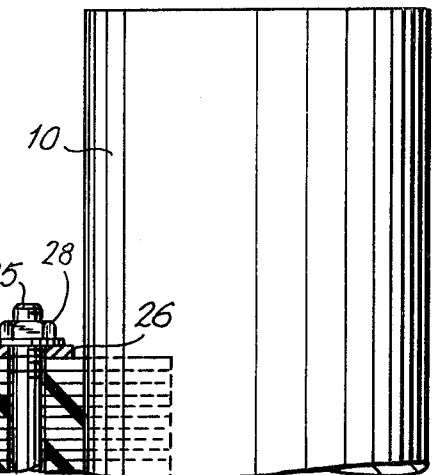
FIG. 4
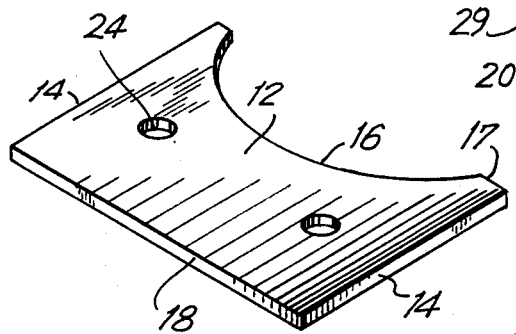
FIG. 5
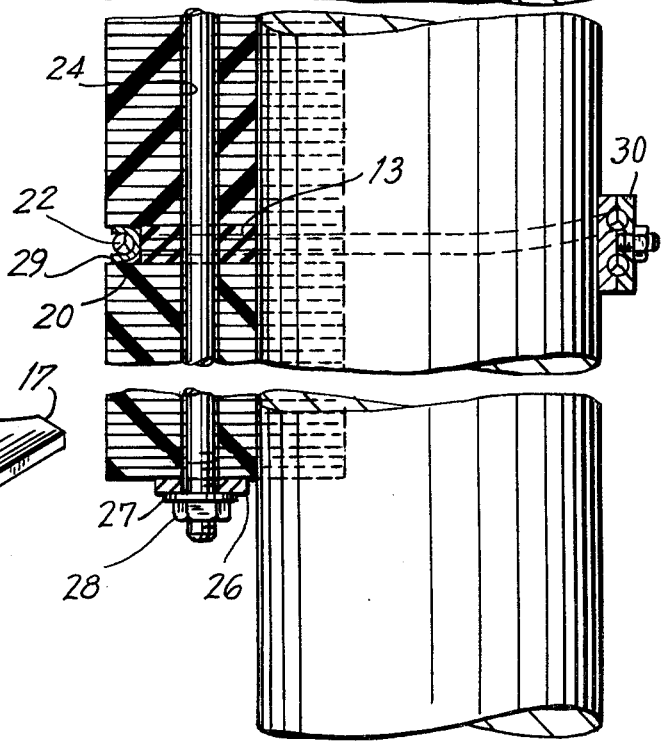

LAMINATED PIER BUMPER

BACKGROUND AND SUMMARY OF THE INVENTION

Marine docks and piers, and the pilings provided for the support thereof, typically are provided with protective bumper coverings, both to absorb the impact of an approaching marine vessel and to receive the wear and chafe caused by movement of a docked vessel relative to the pier.

In accordance with the present invention, a new marine pier bumper assembly is provided which represents a significant improvement over arrangements presently utilized, in terms of both effectiveness in use and long term costs.

In accordance with one specific feature of the invention, a bumper assembly arrangement, known to be useful and effective in terms of absorbing direct impact at a truck loading dock for example, is modified in a novel and highly advantageous manner, to enable these desirable properties to be utilized in conjunction with the protection of marine pilings against both impact and chafe. In connection with truck dock loading bumpers, for example, it has been known to utilize laminated resilient plates, placed under compression, to absorb the impact of a truck backing up against a loading platform. Such bumpers have been commercially sold by Pawling Rubber Corporation, of Pawling New York. Pursuant to the present invention, a highly compressed laminated stack of resilient plates is formed to provide a partially cylindrical concavity on its inside surface, enabling the laminated assembly to receive and generally conform to a cylindrical marine piling. To advantage, a plurality of vertical stacks of the compressed, resilient plates are arranged in side-by-side fashion, on adjacent pilings, to form a relatively solid protective wall. The individual resilient plates desirably are formed of a rubberized fabric material, for which a suitable raw material is used, truck tires, for example.

The improved pier bumper of the invention is ideally suited for the severe marine environment of saline tidal waters and is capable of a long and effective operating life in such environment.

DESCRIPTION OF THE DRAWINGS

FIG. 1 is a perspective view of a marine pier bumper constructed in accordance with the invention, illustrating the bumper secured in the manner of the invention to a typical marine piling.

FIG. 2 is a top plan view illustrating an advantageous arrangement of multiple pilings, arranged in side-by-side relation, each provided with a pier bumper assembly according to the invention.

FIG. 3 is a cross sectional view as taken generally on line 3—3 of FIG. 1.

FIG. 4 is a vertical cross sectional view as taken generally on line 4—4 of FIG. 3.

FIGS. 5 and 6 are perspective views of individual resilient plates utilized in constructing the pier bumper assemblies of FIGS. 1-4.

DESCRIPTION OF A PREFERRED EMBODIMENT OF THE INVENTION

Referring now to the drawings, the reference numeral 10 designates generally a typical marine piling, as used in connection with the support of a marine pier, for example. In some cases, the pilings are independent of a pier and are used as dolphin posts to guide or position marine vessels. The pilings 10 may be long wood poles. However, concrete or steel pilings are also utilized, and the invention is particularly useful in connection with a relatively non-resilient piling materil, such as concrete.

According to the invention, the pier bumper is comprised of a vertically laminated stack 11 of individual resilient plates 12, 13 (see FIGS. 5 and 6). Although specific dimensions are not critical to the invention, a typical marine dock bumper according to the invention may have an overall height of, for example, 16 feet, for protecting a dock or piling intended to receive large oceangoing vessels. The thickness of the individual plates 12, 13 may, in such cases, be on the order of one-half inch.

For use in connection with a marine piling of, say, 12 to 14 inches in diameter, the individual resilient plates 12, 13 may have an overall width of thirteen to fourteen inches, and advantageously they will be formed with more or less straight, parallel side edges 14, 15. As reflected particularly in FIG. 3, the plates 12, 13 are formed with a concave, arcuate inside face or edge 16 arranged to conform to and embrace the cylindrical contour of the piling 10. In a typical installation, the radius of the concave arcuate edge 16 may be on the order of 6½ to 7 inches, for a piling of the size mentioned, and the overall depth of the concave recess, measured from the edge extremities 17 to the deepest part of the recess, may be on the order of four inches, so that as much as a third of the piling is embraced by the contour of the bumper plate.

The external contours of the pier bumper are determined primarily by the plate 12, which may be provided with a flat outer surface 18. The overall thickness of the pier bumper assembly is determined by the spacing of the front surface 18 from the front face of the piling and, in an installation of the proportions mentioned hereinabove, this thickness may be on the order of 6 inches. The plates 12 thus may be considered as the primary plates of the assembly. The secondary plates 13 are located within the stack, typically in two or three limited areas, to form grooves or recesses 19 in the front face of the bumper assembly. Thus, the front-to-back dimension of the secondary plates may be around 4½ inches, for example, as compared to 6 inches for the primary plates. By arranging the secondary plates 13 in limited groups of about three plates, as reflected in FIG. 4, grooves 19 of ample width to receive securing cables may be provided. In this respect, the front surfaces 20 of the secondary plates advantageously are provided with a gentle curvature along the front, together with shorter radius curves at the corners 21, to accommodate flexible securing cables 22 as indicated in FIG. 3, for example.

The resilient bumper plates 12, 13 are provided with pairs of openings 24 for the reception of compression rods 25. The location of the openings 24 in the primary and secondary plates is uniform with respect to the side edges and the concave arcuate edge. Thus, when a large plurality of the plates is stacked on the compression rods 25, all of the side edges 14, 15 and all of the arcuate edges 16 are in substantial alignment. Likewise, all of the front edges 18 of the primary plates are in substantial alignment, whereas the front edges of the secondary plates are slightly recessed to form the grooves 19, as desired. Compression plates 26, along with appropriate washers 27 and nuts 28 are utilized to place the rods 25 under substantial tension, and thereby correspondingly compress the laminated stack of resilient plates. The compression plates 26, for an installation of the proportions mentioned, typically may be on the order of eleven by four inches, three-eights of an inch thick, and these plates are loaded by one inch rods 25 to provide around 1500 pounds compression to the stack.

The assembled stack of laminated plates is secured in vertical orientation to the front face of a piling 10 by means of two or more of the securing cables 22. To distribute the load of the cables across the front face of the bumper stack, a bearing member 29, comprised of a split section of steel tubing, forms a semicylindrical bearing groove. The bearing member 29, which is slightly longer than the front face width of the pier bumper, may be bent to extend slightly around the rounded corners 21 of the grooves 19, distributing the load of the cable 22 and also minimizing chafe between the cable and the resilient bumper stack. In a typical bumper assembly as above described, in which the overall width may be thirteen-fourteen inches, a semicylindrical section of tubing about sixteen inches in length is appropriate.

The manner of securing the cables 22 is not significant to the invention. However, in a typical installation, the cables will be directed around the back of the piling 10, and crossed in side-by-side relation in a suitable clamping member 30. The cables may be placed under tension by a hydraulic jack or similar tool (not shown) after which the clamping device 30 may be tightened to lock the cables under tension, securing the bumper assembly tightly against the piling 10.

To particular advantage, bumper assemblies 31 may be used in a side-by-side array, as reflected in FIG. 2. Thus, a series of marine pilings 10 may be arranged in a side-by-side manner, and a series of the vertically oriented dock bumper assemblies of the invention secured thereto by cables 22. Typically, in such a case, either the assemblies or the cable receiving groove therein may be slightly offset. As will be readily appreciated, the front face areas 32 of the side-by-side array of bumper assemblies 31 form a broad wall-like face to resist impact and chafe. With this arrangement, there is some side-to-side support imparted between adjacent bumper assemblies.

The new bumper assembly of the invention takes advantage of the known desirable characteristics of laminated bumper stacks and adapts such stacks in a way for use in connection with marine pilings for resisting impact and chafe. The bumper assembly is proportioned to be substantially as wide as the piling itself, and is provided with a deep cylindrical recess in the back to embrace the piling to a substantial extent. In this manner, impact is widely distributed over the face of the piling, a feature of particular importance in connection with concrete pilings, for example, which have little resilience of their own. The bumper assemblies are easily constructed to be of any reasonable length, so as to be easily designed for the tidal range of a given locality as well as for the contemplated size of the vessels to be accommodated at the dock.

The bumper assembly of the invention, utilizing rubberized fabric from, for example, used truck tire carcasses, and assembled with galvanized steel components, is ideally suited to the severe environment required in marine service. Moreover, installation of the new pier bumper assemblies is quick and efficient, easily accommodating the dimensional variations which can be expected.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A pier bumper assembly for reception on a marine piling, comprising
   a. a laminated stack of resilient plates,
   b. means for maintaining said stack of resilient plates under compression,
   c. selected ones of said resilient plates having a lesser front-to-back depth than others to form spaced grooves in the front face of said bumper assembly for the reception of securing cables,
   d. the side, front and back edges of the remaining ones of said plates being substantially aligned to define the side, front and back faces of said bumper assembly,
   e. the back face of said assembly having an arcuate contour with a depth of more than half its radius,
   f. said radius conforming generally to that of the piling receiving said assembly, and
   g. means for securing said bumper back face tightly to a face of the piling, said means extending through said spaced grooves.

2. The pier bumper assembly of claim 1, further characterized by
   a. said resilient plates being relatively thin in relation to width, and
   b. the width of said bumper assembly corresponding generally to the diameter of the piling.

3. The pier bumper assembly of claim 2, further characterized by
   a. a plurality of pilings being arranged in side-by-side fashion, and
   b. a plurality of said pier bumper assemblies being arranged in side-by-side fashion on the respective pilings.

4. The pier bumper assembly of claim 1, further characterized by
   a. said selected plates being arranged in groups to form grooves of greater width than the thickness of the individual plates,
   b. bearing members of arcuate cross section being received in said grooves, and
   c. flexible cables received in and engaging said bearing members and extending around the piling to secure the bumper assembly thereto.

* * * * *